United States Patent
Nehls et al.

(10) Patent No.: US 8,088,425 B2
(45) Date of Patent: Jan. 3, 2012

(54) APPARATUS AND METHOD FOR SURFACE TREATMENT OF A FOOD PRODUCT

(75) Inventors: Amy L. Nehls, Pardeeville, WI (US); Vernon D. Karman, Poynette, WI (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1778 days.

(21) Appl. No.: 10/681,649

(22) Filed: Oct. 8, 2003

(65) Prior Publication Data
US 2005/0079261 A1    Apr. 14, 2005

(51) Int. Cl.
*A23L 3/00* (2006.01)
*A23L 3/16* (2006.01)
*A23B 4/005* (2006.01)

(52) U.S. Cl. .................. 426/511; 426/510; 426/521

(58) Field of Classification Search .......... 426/510, 426/511, 523, 521, 407, 461; 99/293, 473, 99/467, 474, 452, 453, 624, 426, 441, 443
See application file for complete search history.

(56) References Cited

U.S. PATENT DOCUMENTS

| | | | |
|---|---|---|---|
| 1,798,120 A * | 3/1931 | Grindrod | 426/573 |
| 2,027,590 A * | 1/1936 | Hirsch | 34/281 |
| 2,131,753 A * | 10/1938 | Reid | 422/109 |
| 2,153,572 A * | 4/1939 | Kennedy et al. | 34/336 |
| 2,353,256 A * | 7/1944 | Maywald, Jr. | 156/184 |
| 2,682,827 A * | 7/1954 | Gressly | 99/473 |
| 2,898,245 A * | 8/1959 | Morgan, Jr. | 127/50 |
| 2,909,985 A * | 10/1959 | Abrams | 99/453 |
| 2,919,639 A * | 1/1960 | Cronin | 99/483 |
| 3,005,716 A * | 10/1961 | Moreland | 426/245 |
| 3,052,559 A * | 9/1962 | Peebles | 426/412 |
| 3,291,680 A * | 12/1966 | Justus et al. | 162/272 |
| 3,545,024 A * | 12/1970 | Randrup | 15/60 |
| 3,586,510 A * | 6/1971 | Farkas et al. | 99/352 |
| 3,620,766 A * | 11/1971 | Wallace | 426/284 |
| 3,889,009 A * | 6/1975 | Lipoma | 426/234 |
| 4,782,643 A * | 11/1988 | Stark | 53/127 |
| 4,865,857 A * | 9/1989 | Inagaki | 426/241 |
| 5,045,021 A * | 9/1991 | Borup | 452/74 |
| 5,189,948 A * | 3/1993 | Liebermann | 99/443 C |
| 5,407,692 A * | 4/1995 | Caridis et al. | 426/510 |
| 5,409,576 A * | 4/1995 | Tleimat | 202/174 |
| 5,439,694 A * | 8/1995 | Morris, Jr. | 426/511 |
| 5,514,403 A | 5/1996 | Webb et al. | |
| 5,711,981 A | 1/1998 | Wilson et al. | |
| 5,741,536 A | 4/1998 | Mauer et al. | |
| 5,772,958 A * | 6/1998 | Nielsen | 422/1 |
| 5,976,005 A | 11/1999 | Wilson et al. | |
| 6,019,033 A | 2/2000 | Wilson et al. | |
| 6,080,437 A | 6/2000 | Mauer et al. | |
| 6,098,307 A * | 8/2000 | Pikus et al. | 34/368 |
| 6,245,294 B1 | 6/2001 | Goldberg et al. | |
| 6,291,003 B1 | 9/2001 | Riemann et al. | |

FOREIGN PATENT DOCUMENTS
EP    0 790 778 B1    4/1999
(Continued)

*Primary Examiner* — Viren Thakur
(74) *Attorney, Agent, or Firm* — Fitch, Even, Tabin & Flannery (57) ABSTRACT

A method and apparatus for treatment of an outer surface of a food product are provided using a fluid having properties selected for treating the surface and bringing the fluid into contact with an outer surface of the food product in a generally continuous manner in a commercial food processing environment.

21 Claims, 10 Drawing Sheets

FOREIGN PATENT DOCUMENTS

| | | | |
|---|---|---|---|
| EP | 0 923 871 A1 | 6/1999 | |
| GB | 1562590 A | * | 3/1980 |
| WO | WO 00/25594 A1 | 5/2000 | |
| WO | WO 00/35495 A1 | 6/2000 | |

* cited by examiner

APPARATUS AND METHOD FOR SURFACE TREATMENT OF A FOOD PRODUCT

FIELD

A method and apparatus for treating the surface of a food product, and in particular a method and apparatus of treating the surface of a food product by contacting the surface of the food product with a fluid having properties selected for treating the surface.

BACKGROUND

A continual objective in the food processing industry is to prevent unacceptably high levels of microbial activity on the food products themselves and on devices for processing the food products that contact the food products. Another objective is to reduce costs associated with the processing of food products. Costs can be reduced by increasing productivity, including both increasing the rate at which food is processed and reducing any periodic down time necessary for cleaning.

Steam pasteurization has been used to heat the surface of food products, such as meat, to treat the surface in a non continuous manner where a piece of meat is stopped in a steam region and steam is directed at the meat while stopped. For example, U.S. Pat. No. 6,291,003 discloses an apparatus having three regions separated by doors, a dewatering region, a steam region, and a coolant region. A controller controls a conveyor to move meat between the three regions, including stopping the conveyer in the steam region for the application of steam.

A problem with typical steam treatment methods and devices is that the steam tends to form condensate on the outer surfaces of the food product. The condensate is formed rapidly as the high temperature steam first contacts the much lower temperature food product. Once a condensate layer forms on the outer surface of a food product, the condensate acts as a barrier to additional heat transfer from high temperature steam. Thus, when steam condenses to form condensate on an outer surface of a food product, the effectiveness of the continued steam treatment is significantly lowered.

SUMMARY

A method and apparatus for treating an outer surface of a food product having generally consistent cross-sectional geometry are provided. The methods include placing a food product on an advancement mechanism. A sleeve is provided for generating a flow of fluid, such as steam, having selected properties to treat the outer surface of the food product. The food product is passed in a feed direction through the steam sleeve using the advancement mechanism. While the food product is passing through the steam sleeve, a flow of steam is generated therearound. The steam contacts the outer surface of the food product to elevate the surface temperature to levels high enough for microbial reduction.

Internal passageways or channels may be formed in an interior of the sleeve and sized approximately with the same shape and dimension of a food product that is being treated. The internal dimensions of the sleeve may be sized such that there is a generally constant cross-sectional area and shape between the inlets and outlets. A sleeve may have one or more helical channels or planar channels that channel a fluid, such as steam, at a consistent high velocity along the outer surface of the food product surface as the product is advanced through the sleeve. Fluid inlets and outlets are placed at the end of the channels and may extend through the sleeve walls.

Applying steam to the product advantageously can achieve an extremely rapid thermal surface pasteurization of the food product. The steam inherently provides high heat transfer rates, and when steam is applied at high velocities, increased rates of heat transfer may be achieved.

The arrangement of the channel or channels within the steam sleeve may be configured to maximize heat transfer from the steam to the food product which provides the benefits of reducing the necessary exposure time of the food product in the steam sleeve, thereby increasing manufacturing efficiency and the speed at which the food product may be advanced through the steam sleeve. Another benefit is a reduction of the sleeve length. By reducing the sleeve length, production space for food processing can be saved and the sleeve can be added to existing processing equipment with minimal modifications.

Another benefit is that focusing the heat treatment on the surface may minimize any adverse impact on texture, flavor or other properties of the food product. Yet another benefit of the steam sleeve is that it may minimize the amount of post-treatment cooling required to return the product to the original thermal state.

A benefit of having the helical or generally planar steam channels is that the flow velocity generates centrifugal forces that can tend to keep moving the steam condensate to the outer part of the channel and away from the surface of the food product. If the condensate were not moved away from the surface, it could act as an insulating barrier on the product surface, slowing the heat transfer.

Using multiple helical channels solves a problem encountered in trying to maintain high velocities in a longer single helix. As the steam travels along the helix it slows due to the volume reduction that occurs due to steam condensation, which increases further from the inlet. Another advantage of using multiple helical channels is that the multiple channels may accommodate opposing flow in sequential channels to ensure adequate coverage of the outer surfaces of the food product by the fluid.

The overall length of the sleeve can determine the desired number of helical channels or planar channels. For instance, a single helical channel may be provided in a shorter sleeve or a double helix may be provided in a longer sleeve. The longer the sleeve, the more helical channels may be needed to maintain high velocities of steam.

The methods may further include the step of circulating the flow of steam within a channel having an inlet for introduction of the steam into the sleeve and an outlet for removal of the steam and condensate from the sleeve after circulation. In addition, the method may include providing a condensate removal mechanism positioned adjacent the sleeve and in fluid communication therewith for removing excess condensate.

The steam sleeve may include multiple interconnected spiral or helical channels, allowing the steam to be introduced into the inlet of the channel and follow the helical channel around the outer surface of the food product to treat the outer surface of the food product. The multiple interconnected helical channels may be arranged such that the inlet and the outlet are positioned so that the flow of steam is in a general direction along or opposite to that of the feed direction of the food product.

More than one set of interconnected helical channels may be provided, such that each has its own inlet for the introduction of steam into the sleeve and its own outlet for removal of the steam and condensate from the sleeve. Where multiple interconnected helical channels are provided, one of the channels may have the inlet and outlet positioned so that the flow of steam is in a general direction opposite to that of the feed direction of the food product and another may have the inlet and outlet positioned so that the flow of steam is in the same general direction as that of the feed direction of the food product. In this manner, the steam will flow in one channel in the direction of the feed and in the other channel opposite to the direction of the feed to ensure adequate and balanced coverage of the surface with steam. In addition, the circulation rates of the steam within the sleeve at opposite ends thereof can be generally the same to further ensure consistent steam treatment throughout the sleeve.

When a longer steam sleeve is desired, more than one set of interconnected helical channels may be used, and each of the helical channels may be multidirectional. Each of the helical channels may have pair of fluid inlets and at least one outlet. The pair of fluid inlets may be positioned proximate the mid section of the sleeve. As the fluid is introduced into the pair of fluid inlets, one of the inlets may cause the fluid to flow in the helical channel toward the entrance opening of the sleeve and the other one of the inlets may cause the fluid to flow in the same helical channel toward the exit opening of the sleeve.

The step of passing the food product, such as elongated food product or log of food, in the feed direction through the steam sleeve using the advancement mechanism may include the step of forming a general seal between the outer surface of the food product and the steam sleeve using a generally flexible wiper element. The wiper element may be positioned at both the entrance and the exit of the steam sleeve and may be sized to have an opening slightly smaller than the profile of the food product and positioned to ensure that minimal steam escapes the steam sleeve. The step of passing the food product in a feed direction through the steam sleeve using the advancement mechanism and generating the flow of steam in a steam sleeve while the food product is passing therethrough may occur generally simultaneously in a continuous manner.

The step of circulating the flow of steam in a steam sleeve within a channel having an inlet for introduction of steam into sleeve and an outlet for removal of the steam from the sleeve may include the step of forming multiple channels each having its own inlet and outlet. Each of the multiple channels may be substantially planar, therefore defining a fluid path of about one revolution around the interior of the sleeve.

The food product is preferably advanced in a feed direction through the steam sleeve at a predetermined rate. The method may include the step of selecting the predetermined rate and the fluid properties to achieve a satisfactory microbial reduction on the surface of the food product.

The apparatus for use in the above methods and other methods comprises a steam sleeve having an entrance opening and an exit opening. The entrance and exit openings of the steam sleeve are sized approximately the same as the profile of the food product in order to accommodate the food product therein. A plurality of grooves or channels are formed on an interior of the steam sleeve between the entrance opening and the exit opening. The channels direct the flow of fluid at least partially around an outer portion of the food product and at least one of the channels has a fluid inlet and at least one of the channels has a fluid outlet to permit introduction and removal of the fluid into the steam sleeve.

At least two of the plurality of channels may be connected to permit the flow of fluid therebetween. The plurality of channels may be connected in a generally spiral or helical arrangement. The channels may also be connected to internal piping within the sleeve to facilitate fluid flow between the channels.

A seal element may be provided proximate at least one of the entrance and exit openings of the sleeve. The seal element has an opening substantially the same size of the profile of the food product. The opening of the seal element also may be smaller than the opening of at least one of the entrance and exit openings of the steam sleeve. The seal element is configured to provide a seal between the steam sleeve and the food product to inhibit the fluid from escaping to maintain desired flow characteristics of the fluid, and to maintain the fluid at an elevated temperature.

The fluid may comprise steam having a predetermined properties selected to treat the outer surface of the food product, such as for preventing unacceptable levels of microbial activity. Other treatment fluids or anti-microbial fluids may be used, or may be combined with the steam. High velocity steam may be used in the steam sleeve to treat the outer surface of the food product. High velocity steam can be advantageous because it can have a relatively high heat transfer rate and thus can cause a greater reduction in microbial activity on the surface of the food product.

The entrance and exit openings of the steam sleeve may be shaped similar to the cross-sectional shape of the food product. For example, the openings may be generally circular-shaped for generally circular food products. Other opening shapes include square and rectangular in order to accommodate, respectively, square and rectangular food products. Alternatively, the entrance and exit openings of the steam sleeve may be generally D-shaped for different types of food product having a generally D-shaped profile. With some product shapes, such as some D-shaped products, there can be a greater variance in the profile of the food product. Thus, the D-shaped steam sleeve may be sized to accommodate variations in the profiles of food product. In order to form a seal between the steam sleeve and the food product in order to reduce steam from escaping, to maintain desirable flow characteristics of the steam within the sleeve, and to maintain a higher temperatures of the steam within the steam sleeve, a wiper material may be provided around the opening and exit of the D-shaped steam sleeve.

A different steam sleeve configuration may comprise a plurality of plates that are sandwiched together. Each of the plates may have a channel formed therein. Sandwiched between the plates may be dividers, which may comprise the wipers, in order to keep the steam from transferring from one channel to another in the steam-sleeve. Each of the channels can have its own inlet and outlet. When multiple channels and plates are arranged in a sandwiched fashion, it is preferable that the flow alternates. For example, in one channel flow may be clockwise and in an adjacent channel, counterclockwise.

The sleeve may be used as part of a commercial food processing operation. The commercial food processing operation may proceed through multiple treatment areas where the food product is subjected to various treatments, such as a cooking zone, a water deluge zone, a water submergence zone, a chilling zone, an equilibration zone, and a slicing zone. The sleeve may be used during any part of the treatment cycle, and in particular may be used prior to an equilibration zone and a slicing zone to reduce microbial activity on the surface of the food product.

DETAILED DESCRIPTION OF THE DRAWINGS

A method and apparatus for treating the surface of a food product 5 are provided using a fluid having properties for treating the surface of the food product and bringing the fluid into contact with an outer surface of the food product 5 in a generally continuous manner in a commercial food processing environment.

As illustrated in FIGS. 1-19, a treatment sleeve 10, 100 or 200 is provided having an entrance opening and an exit opening. Positioned between the entrance opening and the exit opening of the treatment sleeve 10, 100 or 200 and in an interior thereof are a plurality of channels 16, 110 and 120 or 210 and 211. The channels 16, 110 and 120 or 210 and 211 and the entrance opening and exit opening are configured such that when a food product 5 is being passed-through the treatment sleeve 10, 100 or 200 the outer surface of the food product 5 is exposed to the channels 16, 110 and 120 or 210 and 211. Treatment fluid is circulated through the channels 16, 110 and 120 or 210 and 211, thus coming into contact and treating the outer surface of the food product 5.

The fluid used within the treatment sleeve 10, 100 or 200 is preferably steam. The steam is supplied to the channels 16, 110 and 120 or 210 and 211 for circulation via inlets and outlets for the channels. The steam is preferably delivered with desired properties, such as saturated at a particular pressure or at a predetermined temperature, into the channels 16, 110 and 120 or 210 and 211 effective to treat the outer surface of the food product by facilitating heat transfer from the steam to the outer surface of the food product 5.

As the steam contacts the outer surface of the food product 5, some of the steam may condense and impart a large amount of heat to the product surface, but also form a layer of insulating condensate. The condensate has a lower heat transfer rate as compared to the condensing steam. To remove condensate from contact with the outer surface of the food product 5, the steam is preferably circulated through the channels 16, 110 and 120 or 210 and 211 with a generally predetermined velocity to create sufficient circumferential forces to draw the condensate away from the outer surface of the food product 5 and toward walls of the channels 16, 110 and 120 or 210 and 211.

The channels 16, 110 and 120 or 210 and 211 define flow paths for the steam. The flow path is preferably of a length selected to limit the amount of pressure drop and/or velocity reduction of the steam to ensure sufficient heat transfer from the steam to the outer surface of the food product 5 during treatment. In one embodiment, illustrated in FIGS. 1-4, each generally planar channel 16 makes generally about one revolution around the interior of the treatment sleeve and thus has a generally short flow path. In another embodiment, illustrated in FIGS. 14-18, a pair of helical flow channels 210 and 211 revolve multiple times around the interior of the treatment sleeve 200 while advancing from the exit opening to the entrance opening of the sleeve 200, thus having a longer flow path than the flow path of FIGS. 1-4. In yet another embodiment, illustrated in FIGS. 7-13, two helical channels 110 and 124 are formed around the interior of the treatment sleeve 100. The treatment sleeve 100 of FIGS. 7-13 is longer than the treatment sleeve of FIGS. 14-18. However, the use of multi-directional flow within each of the helical channels 110 and 120, as will be discussed in greater detail below and as opposed to the unidirectional helical flow channels 210 and 211, reduces the overall flow channel lengths 110 and 120 to minimize the amount of pressure drop/velocity reduction of the steam to ensure sufficient heat transfer from the steam to the outer surface of the food product 5 to treat the outer surface.

One or more wiper elements 14 and 220 are provided either in the interior of the treatment sleeve 10 or adjacent the entrance and/or exit openings of the treatment sleeve 10 and 200. The wiper elements 14 and 220 have an opening therethrough that is sized smaller than the entrance or exit opening of the treatment sleeve 10 and 200. In one aspect, the opening of the wiper element 14 and 220 may be sized smaller than a profile of the food product 5. As the food product 5 is advanced through the interior of the treatment sleeve 10 and 200, the portion of the wiper 14 and 220 adjacent the wiper opening is in contact, or close to being in contact, with the outer surface of the food product 5. The wiper 14 and 220 is preferably made of a flexible material and functions to maintain the steam within the treatment sleeve 10 and 200, maintain desired flow characteristics and prevent unnecessary decreases in the temperature within the treatment sleeve 10 and 200, and, if in contact with the outer surface of the food product 5, to wipe away any excess condensate on the surface of the food product 5.

The food product 5 is advanced through the treatment sleeve 10, 100 or 200 while the steam is circulating through the one or more channels 16, 110 and 120 or 210 and 211 in a generally continuous operation. By advancing the food product 5 through the treatment sleeve 10, 100 or 200 in a generally continuous operation, food processing efficiency can be improved compared to systems where a food product is advanced intermittently through a sealed steam chamber having doors or other barriers that must be opened and closed with each steam cycle.

The length of the treatment sleeve 10, 100 and 200 and the advancement rate of the food product 5 combine to provide a dwell time, the amount of time the food product is in contact with the steam in the treatment sleeve. The dwell time and the heat transfer rate due to the steam applied to the outer surface of the food product 5 combine to determine the amount of heat transferred from the steam to the food product 5 while the food product 5 is advancing through the treatment sleeve 10, 100 and 200.

The steam transfers heat to the food product 5 and by conduction permeates the food product 5 to various depths, depending upon the dwell time and the heat transfer rate due to the steam. A one second dwell time, as illustrated in the predicted thermal model of FIG. 18, results in elevated temperatures on the surface and very close to the surface sufficient to treat the surface, while not permeating very deeply into the food product 5. Thus, the majority of the food product 5, which is positioned inwardly from the outer surface of the food product 5, is not subject to substantially elevated temperatures. This contributes to minimal changes in the texture and appearance of the food product 5 as compared to a food product not advanced through the treatment sleeve 10, 100 or 200. In addition, not substantially elevating the temperature of the food product 5 inwardly of the surface thereof results in a relatively fast cool time for the product 5 to return to its original thermal state after leaving the treatment sleeve 10, 100 or 200. The dwell time within the sleeve, and the temperature of the fluid, are preferably selected to allow for optimized slicing of the food product when used upstream of a slicing station. For example, if the food product is raised to too high of a temperature and at too deep of a depth, slicing can be difficult, and tearing of the food product may result. Tearing can be undesirable in certain applications where the aesthetic appearance of the sliced food product is adversely affected.

Figure 18:
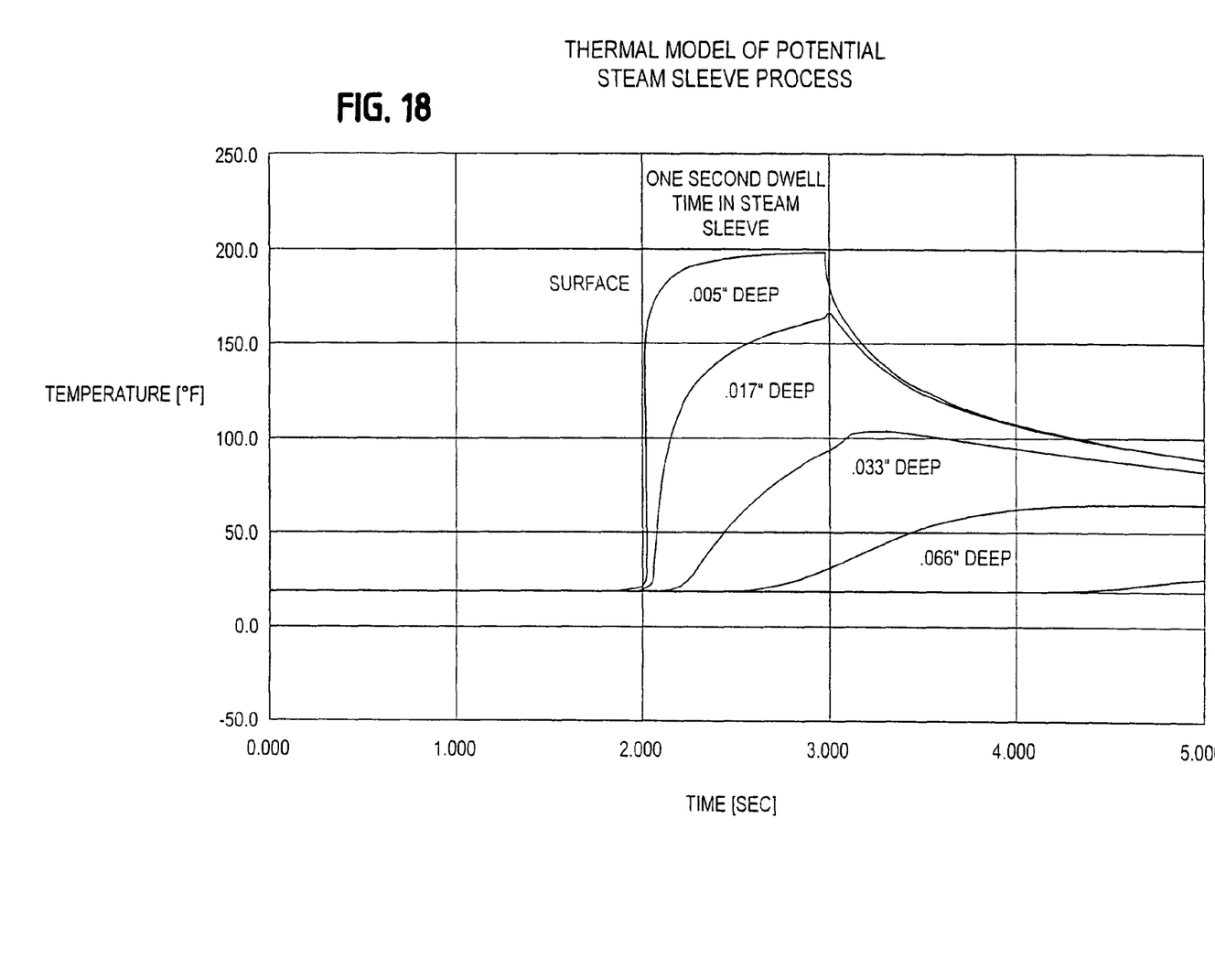
FIG. 18 is a plot showing a predicted thermal model of the temperature at various depths from the surface of the food product at compared to travel time through the steam sleeve.

As illustrated in FIG. 18, the temperature on the surface of the food product 5 is predicted to be between about 150° F. and 200° F. after a one to three second dwell time within the sleeve as the product has been advanced therethrough. Moving inwardly within the food product 5 from the surface thereof about 0.005 inches, the temperature is predicted to be between about 150° F. and about 200° F. Moving further inward to about 0.017 inches, the temperature is predicted to be between about 75° F. and about 125° F. Even further inward of the outer surface of the food product 5 to about 0.033 inches, the temperature is predicted to be between about 25° F. and about 75° F. Thus, the temperature on the outer surface of the food product 5 is highest, and then the temperature rapidly decreases the further inward from the outer surface of the food product 5.

Turning now to more of the details of the various aspects of the treatment sleeves 10, 100 and 200, the sleeve 10 illustrated in FIGS. 1-4 has generally D-shaped entrance and exit openings, while the sleeves 100 and 200 illustrated in FIGS. 7-17 have generally circular entrance and exit openings. Other openings, such as rectangular and square, may also be used, depending upon the profile of the food product.

The openings of the treatment sleeves 10, 100, and 200 are configured based on the profile of the food product 5 for which it is associated. For example, meat products comprising bologna and sausage are generally circular shaped in profile and consistently have similar sized profiles. Due to the relatively consistent sizing of the circular-profiled food products 5, the size of the treatment sleeve 100 and 200 entrance and exit openings is sized sightly larger than the size of the food product profile. Other meat products, such as ham, are allowed to naturally settle in their casings, resulting in a generally D-shaped profile, having a flattened bottom. Due to the natural settling, there can be variances in the size of the resulting D-shaped profiles. To accommodate the variances in food product profiles, the D-shaped openings are sized less closely to the product profiles than the generally circular openings. To further accommodate various sizes of D-shaped openings, the corresponding wiper elements 14 are larger in size. Therefore, when there is a smaller D-shaped food product 5 advancing through the treatment sleeve 10, the wiper 14 contacts or closely contacts the outer surface thereof. When a relatively larger D-shaped food product 5 is advancing through the treatment sleeve 10, the wiper 14 flexes to accommodate the size while still contacting the outer surface of the product 5.

Figure 1:
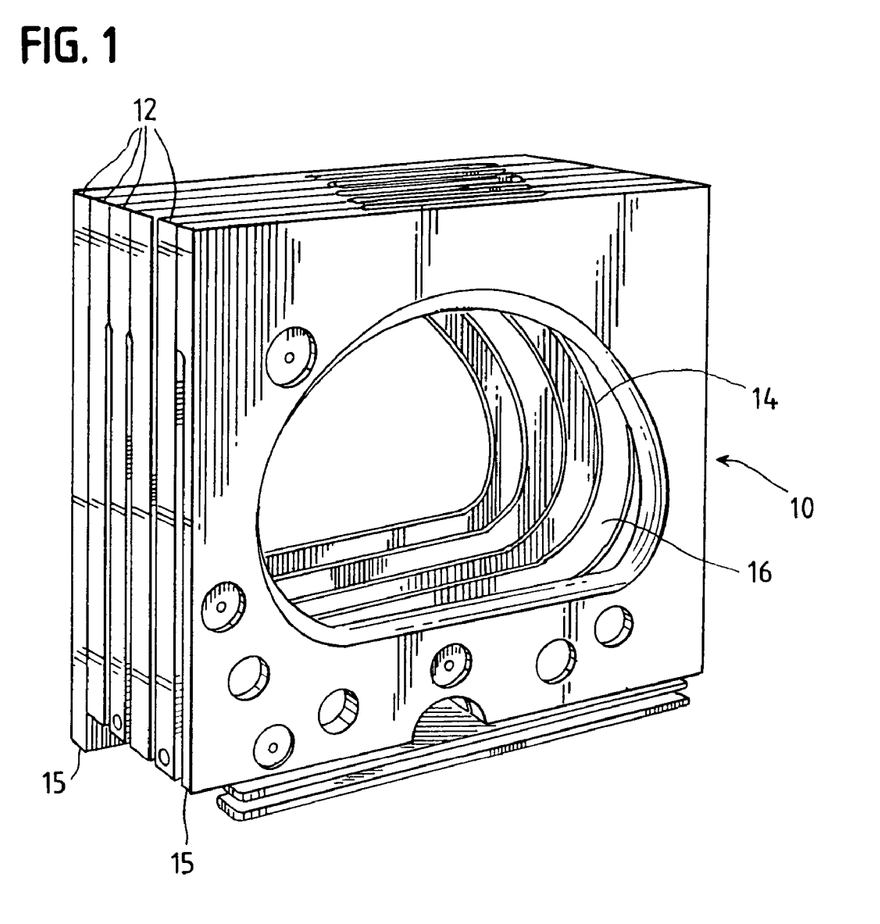
FIG. 1 is a perspective view of a steam sleeve according to a first embodiment having multiple steam flow channels and generally D-shaped openings.
Figure 2:
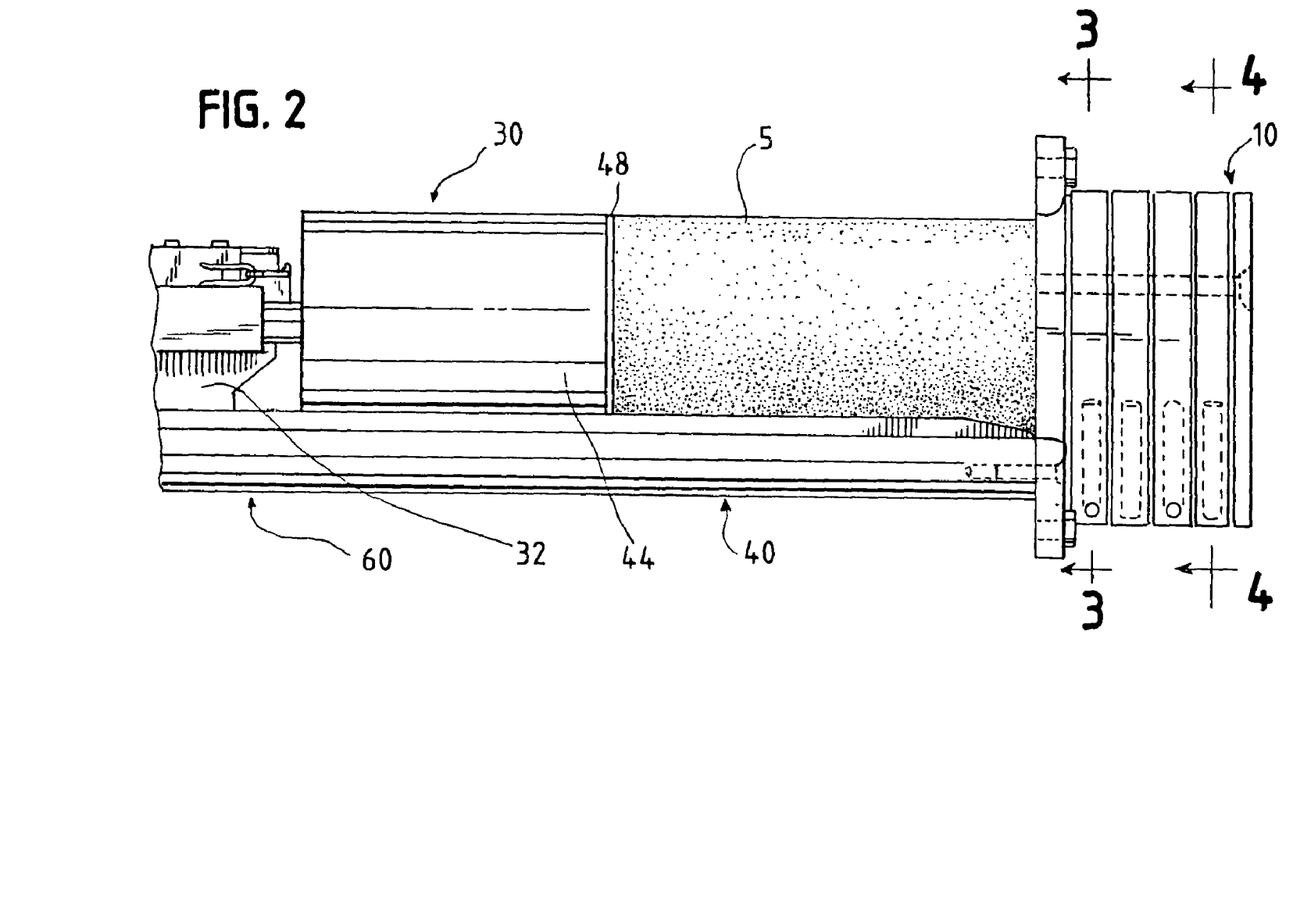
FIG. 2 is a side elevation view of the steam sleeve of FIG. 1 with a food product being advanced therethrough via an advancement mechanism.
Figure 3:
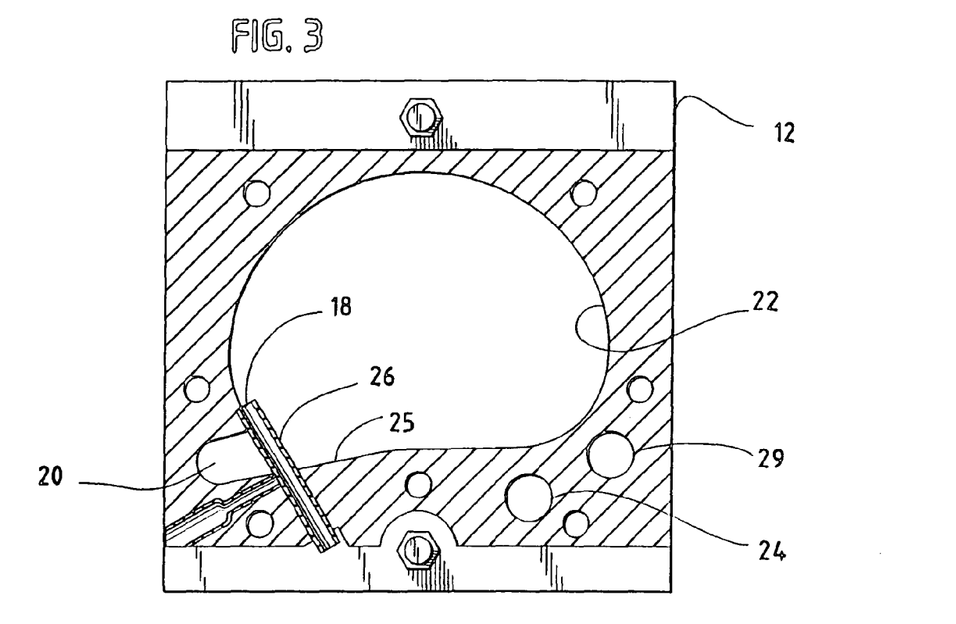
FIG. 3 is a section view taken along line 3-3 of FIG. 2.
Figure 4:
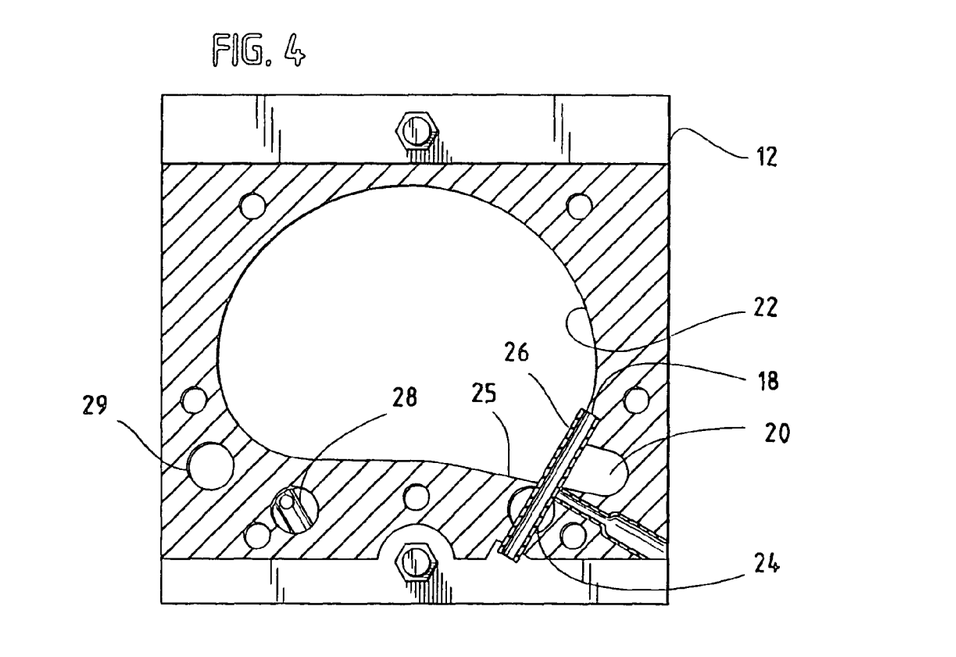
FIG. 4 is a section view taken along line 4-4 of FIG. 2.

The treatment sleeve 10 having the D-shaped entrance and exit openings, illustrated in FIGS. 1-4, is formed of a plurality of abutting plates 12 and 15. As illustrated, there are four channel plates 12 between a pair of face plates 15. A wiper element 14 is positioned between each of the plates 12 and 15. The wiper elements 14 have an opening smaller than the entrance and exit openings, and thus project centrally on each side of the interior surfaces 22 of the channel plates 12 to define channels 16. The face plates 15 are provided to secure the wipers 14 to the adjacent channel plates 12 proximate the entrance and exit openings of the treatment sleeve 10. As illustrated in FIGS. 3 and 4, each of the plates has a fluid inlet 18 and a fluid outlet 20. The fluid inlet 18 includes a nozzle 26 aimed to direct the fluid flow around the interior surface 22 of the channel 16. The nozzle 26 is in fluid communication with inlet plumbing 24 which comprises fluid passages between adjacent plates via a nozzle inlet 28. In close proximity to the fluid inlet 18 is the fluid outlet 20, positioned to allow fluid to exit the channel 16 after approximately a single revolution around the interior surfaces 22 of the plate 12. The interior surfaces 22 of the channel 16 adjacent the fluid outlet 20 include downwardly inclined surfaces 25 directed toward the outlet 20 to facilitate drainage of any condensate. Similar to the fluid inlet 18, the fluid outlet 20 is in fluid communication with outlet plumbing 29 extending between adjacent plates 12 and 15.

The plates 12 are arranged such that the fluid flow in each respective channel plate 12 alternates between clockwise and counterclockwise. For example, in the first channel plate 12 closest to the entrance opening of the sleeve the fluid flow is in a clockwise direction relative to the exit opening. The next channel plate 12 has a counterclockwise fluid flow, followed by a plate 12 with a clockwise fluid flow, and finally a plate 12 with a counterclockwise fluid flow. The widths of the plates 12 and 15 are selected to minimize the amount of space that the treatment sleeve 10 occupies on the food processing equipment. The plates 12 and 15 are each preferably about 0.25 inches in width, resulting in a total length of the treatment sleeve 10 of about 3 inches.

Figure 8:
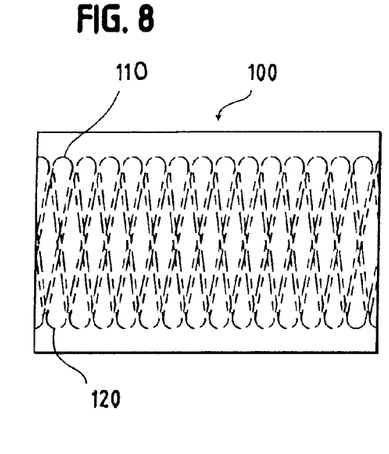
FIG. 8 is a side elevation schematic view of the steam sleeve of FIG. 7 showing multiple helical flow channels.
Figure 9:
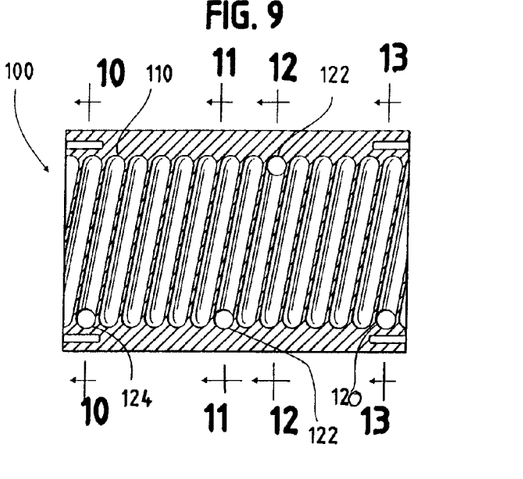
FIG. 9 is a side elevation sectional view of the steam sleeve of FIG. 8.
Figure 10:
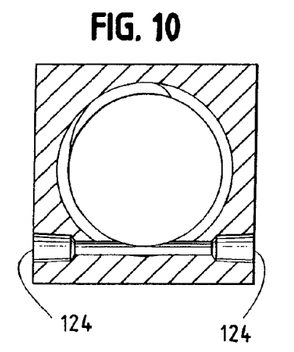
FIG. 10 is a section view taken along line 10-10 of FIG. 9.
Figure 11:
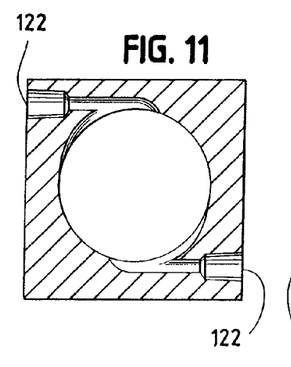
FIG. 11 is a section view taken along line 11-11 of FIG. 9.
Figure 12:
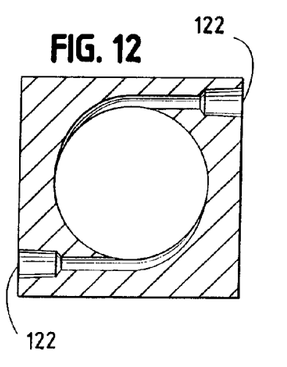
FIG. 12 is a section view taken along line 12-12 of FIG. 9.
Figure 13:
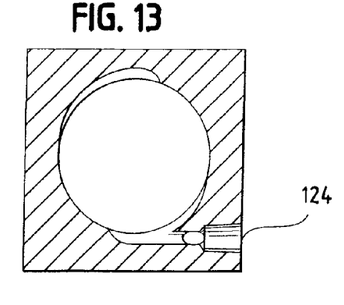
FIG. 13 is a section view taken along line 13-13 of FIG. 9.

The treatment sleeve 100 illustrated in FIGS. 7-13 has a pair of helical flow channels 110 and 120 around its interior. As shown in FIG. 8, the pair of helical flow channels 110 and 120 are configured in a double helix arrangement. Each of the helical flow channels 110 and 120 has a pair of inlets 122. The two helical flow channels 110 and 120 each share a common outlet 124. The inlets 122 are positioned proximate the mid-section of the treatment sleeve 100 and the outlets 124 are positioned proximate the entrance and exit openings for each of the helical channels 110 and 120, as shown in FIG. 9. Fluid is introduced into the treatment sleeve 100 via the four inlets 122, two for each of the helical channels 110 and 120, as illustrated in FIGS. 11 and 12. Because the two inlets 122 for each of the helical flow channels 110 and 120 are in the mid-section of the treatment sleeve 100, the fluid flows along flow paths defined by each channel 110 or 120 both toward the entrance opening and toward the exit opening. At the entrance opening of the treatment sleeve 100, both channels 110 and 120 have a common exit through the fluid outlet 124, as shown in FIG. 13. At the exit opening of the treatment sleeve 100, a pair of fluid outlets 124 are provided, one for each of the helical flow channels 110 and 120, as illustrated in FIG. 10.

Turning to more of the details of the dual helix treatment sleeve 100, the sleeve 100 is configured for treating product with a diameter of about 4.25 inches. The sleeve 100 is between about 9 and 10 inches in length, and preferably about 9.5 inches; between about 5 and 7 inches in height, and preferably about 6 inches; and between about 5 and 7 inches in width, and preferably about 6 inches. The minor radius of the interior of the multi-directional double helix treatment sleeve 100 is between 2 and 2.3 inches, and is preferably about 2.15 inches. The major radius of the interior of the multi-directional double helix treatment sleeve 100 is between about 2.25 and 2.55 inches, and is preferably about 2.4 inches. Thus, the depth of the channels 110 and 120 is preferably about 0.25 inches. The helical channels 110 and 120 are each preferably at an 80° incline relative to the length direction of the treatment sleeve 100, and spaced 1.25 inches apart per revolution. These dimensions are merely given by way of example, and can be readily scaled up or down, or otherwise varied, in accordance with particular sizing requirements for different profiles of food products.

Figure 14:
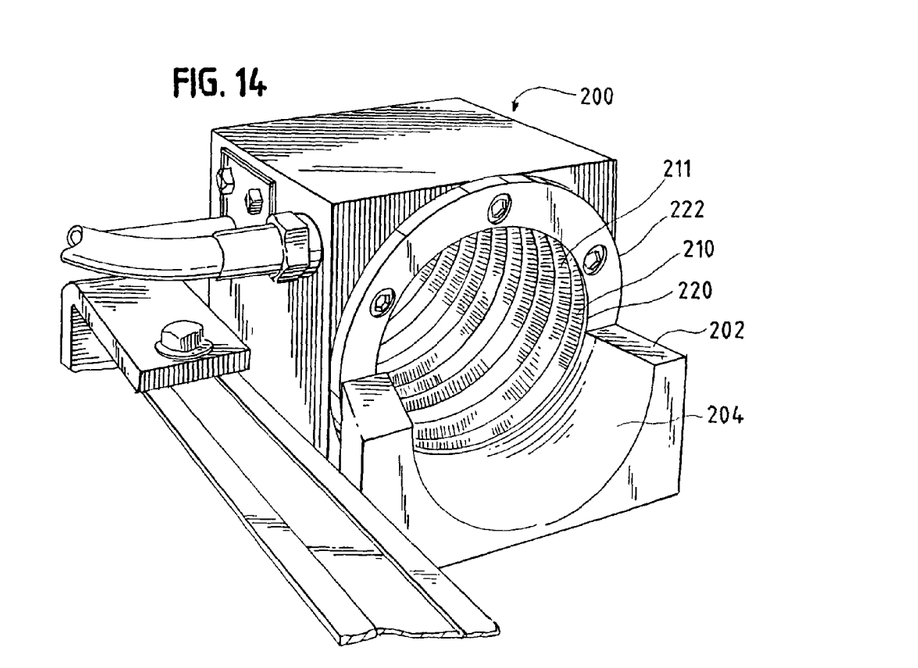
FIG. 14 is a perspective view of a steam sleeve according to a third embodiment having multiple helical flow channel.
Figure 15:
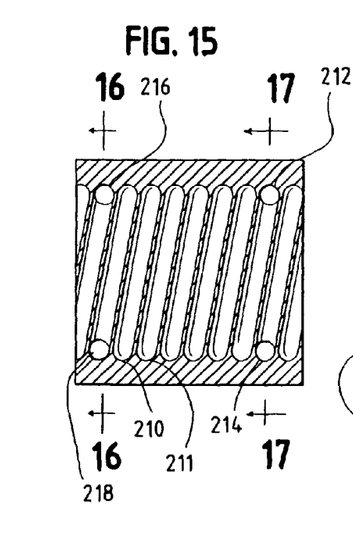
FIG. 15 is a side elevation section view of the steam sleeve of FIG. 14.
Figure 16:
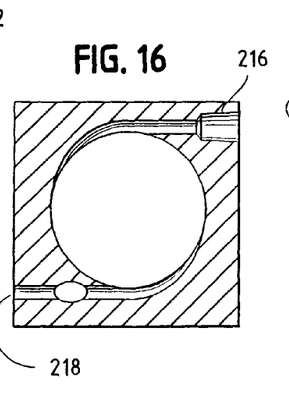
FIG. 16 is a section view taken along line 16-16 of FIG. 15.
Figure 17:
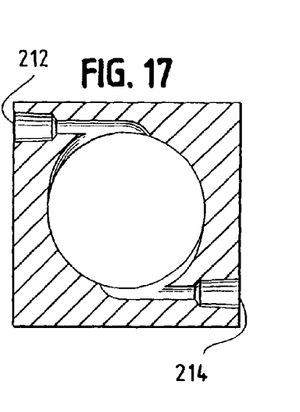
FIG. 17 is a section view taken along line 17-17 of FIG. 15.

Similar to the treatment sleeve 100 of FIGS. 7-13, the treatment sleeve 200 of FIGS. 14-17 has a pair of helical flow channels 210 and 211 around its interior in a double helix arrangement. Each of the helical flow channels 210 and 211 has a single fluid inlet 212 or 216 and a single fluid outlet 214 or 218, as illustrated in FIGS. 15-17. One of the flow channels 211 has its inlet 212 positioned proximate the entrance opening and its outlet 218 positioned proximate the exit opening so that fluid is directed from the entrance opening to the exit opening. The other of the flow channels 210 has its outlet 214 positioned proximate the entrance opening and its inlet 216 positioned proximate the exit opening so that fluid is directed from the exit opening to the entrance opening. When the fluid is steam, the oppositely directed flow paths of the fluid in the fluid channels 210 and 211 ensures that the steam contacts the surface of the food product 5 soon after it enters and soon before it exits the treatment sleeve 200 to treat the outer surface, which also can quickly initiate desired flow. Thus, the amount of condensed steam, with reduced heat transfer properties, that may be present at either the entrance or exit openings of the sleeve 200 can be reduced.

The details of the dual helix treatment 200 sleeve of FIGS. 14-17 are similar to the multi-direction dual helix treatment sleeve 100 of FIGS. 7-13, except that the sleeve is between about 4.75 and 6.75 inches in length, and preferably about 5.75 inches. As discussed above, although particular scaled or otherwise modified to accommodate a variety of different food product profiles.

The treatment sleeve 200 has a wiper element 220 positioned proximate both the entrance opening and the exit opening, for the purposes discussed above in greater detail. The wiper elements 220 are attached to the treatment sleeve via rings 222, as illustrated in FIG. 14, thereby allowing for easy removal of the wiper elements 220 for replacement. A lead-in block 202 is attached to the treatment sleeve 200 proximate the entrance opening to ensure that the food product 5 is properly directed into the interior of the sleeve 200. The lead-in block 202 has an inclined surface 204 that tapers toward the entrance opening to facilitate alignment of the food product 5 with the interior of the sleeve 200.

The food product 5 is advanced through the treatment sleeves 10, 100 and 200 using an advancement mechanism 60. The advancement mechanism 60 comprises a longitudinally extending track 40 aligned with a longitudinal axis of the sleeve 10, as illustrated in FIG. 3. The advancement mechanism 60 further comprises a pusher device 30 movable relative to the track 40 for pushing the food product 5 along the track 40 and through the treatment sleeve 10. Various driving methods may be used for moving the pusher device 30 relative to the track 40. For example, a screw-type drive, pneumatic drive, or a chain or belt drive may be used for advancing the pusher device 30. The rate at which the advancement mechanism 60 feeds the food product through the sleeve can be controlled via a computerized controller. The rate can be determined upon such factors as the thickness of desired slices when the food product is immediately sliced downstream of the sleeve and the desired dwell time within the sleeve. For example, a seven foot length of food product may be advanced through the sleeve at a rate effective to produce 2000 slices per minute of the food product when a slicing station is positioned immediately downstream of the sleeve.

Figure 5A:
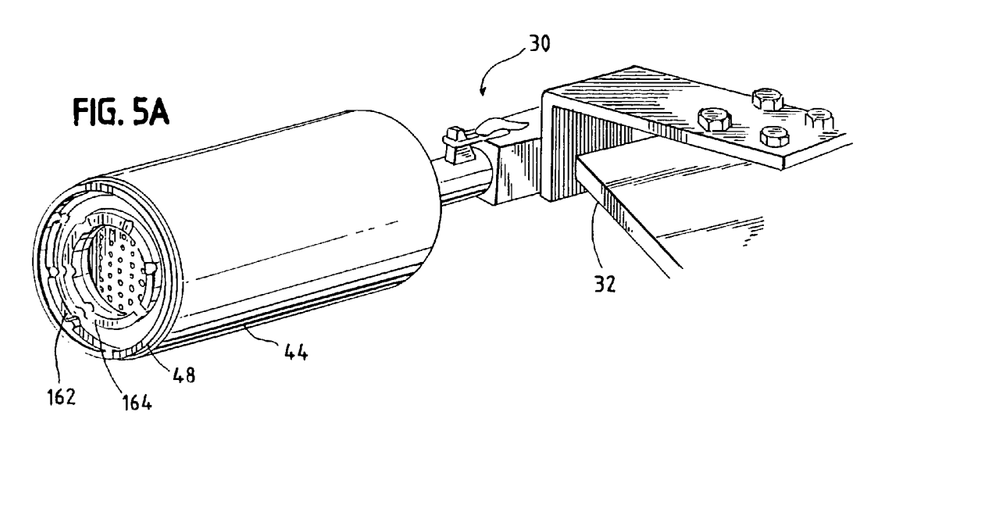
FIG. 5A is a perspective view of a pusher device of the advancement mechanism.
Figure 5B:
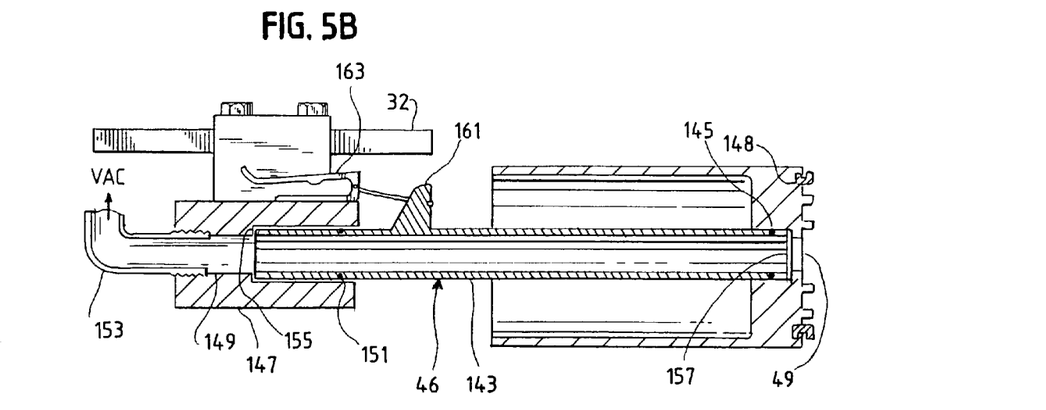
FIG. 5B is a sectional side elevation view of the pusher device of FIG. 5A.

The pusher device 30 includes an arm 32 for movable connection relative to the drive and the track and a food product-facing pusher portion 44, as illustrated in FIGS. 5A and 5B. When the pusher device 30 is advanced toward the treatment sleeve 10, the pusher portion 44 contacts an end of the food product 5 to push the food product 5 through the sleeve 10. The distance between the arm 32 and the pusher portion 44 is preferably selected to ensure that the pusher portion 44 is able to extend completely or at least partially through the steam sleeve 10, 100 or 200, as illustrated in FIG. 2, in order to maximize the amount of food product 5 passed through the treatment sleeve 10, 100 or 200.

The pusher portion 44 has a flexible flange member 48 positioned at one end to securely abut the end of the food product 5 in order to assist in maintaining a vacuum seal between the end of the food product 5 and the pusher portion 44. The flange member 48 protrudes from the end face of the pusher portion 44 and partially surrounds the trailing face of the food product 5. The flange member is preferably formed of a flexible plastic or rubber material suitable for contact with food products, and is inserted into a groove formed 148 formed on the face of the pusher portion 44 abutting the food product 5.

The pusher portion 44 also has an aperture 49 connected to a vacuum assembly 46 for further securing the food product 5 to the pusher 30 when vacuum is applied. The vacuum assembly 46 comprises a hollow shaft 143 having the pusher portion 44 mounted at one end thereof. A gasket 145 is positioned between the pusher portion 44 and the hollow shaft 143 to reduce pressure losses when a vacuum is applied. The opposite end of the hollow shaft 143 is removable received within a bore 149 within a mounting block 147, which is secured to the arm 32. The bore 149 extends through the mounting block 147, as shown in FIG. 5B. One end of the bore 149 has a diameter sufficient to receive the hollow shaft 143, and a gasket 151 is positioned therebetween to reduce pressure losses when a vacuum is applied. The other end of the bore 149 has a different diameter than the first end, and has a vacuum connection 153 permanently received therein. A step 155 is located within the bore 149 where the bore changes diameters to provide a stop for fixing the relative position between the hollow shaft 143 and the mounting block 147. When a vacuum is applied via the vacuum connection 153, the pressure drop continues through the bore 149, through the hollow shaft 143, and through the aperture 49 formed in the end of the pusher portion 44 facing the food product 5. A screen 157 is positioned within the aperture 49 to restrict portions of the food product 5 from entering the hollow shaft 143 when the vacuum is applied. The face of the pusher portion 44 abutting the food product 5 is configured with a pair of concentric, raised rings 162 and 164. The rings 162 and 164 each have multiple notches formed therein. When vacuum is applied to draw the food product 5 against the pusher portion 44, the rings 162 and 164 assist in evenly distributing the vacuum forces along the trailing face of the food product 5. In particular, the raised rings 162 and 164, along with the flange member 48, can allow for food products 5 having variations in the trailing face surface to be securely maintained against the pusher portion 44 when a vacuum is applied.

The pusher portion 44 may be sized and shaped to closely fit within the opening of the wiper elements 14 in order to assist in maintaining the desired flow characteristics of the fluid as the pusher portion 44 urges the food product 5 through the steam sleeve 10, 100 or 200. For example, if the food product has a D-shaped profile, the pusher portion may have a corresponding D-shaped profile. The pusher portion 44 is attached to the pusher 30 via threads, so that the pusher portions can be easily interchanged and cleaned.

The pusher portion 44, along with the hollow shaft 143, are configured to be removable from the mounting block 147 in order to allow for cleaning and replacement with pusher portions 44 having different sizes and profiles. A protruding securement element 161 is attached to the shaft 143, as shown in FIGS. 5A and 5B. The securement element 161 has a notch 165 for receiving a free end of a clamp 167. An end of the clamp 167 opposite the free end is secured to a clamp actuator 163. The clamp actuator 163 is movable between a disengaged position allowing for the free end of the clamp 167 to be removable from and insertable into the notch 165 of the securement element 161 and an engaged position securing the clamp 167 in the notch 165 of the securement element 161 to secure the pusher portion 44 and shaft 143 relative to the mounting block 147.

Figure 6:
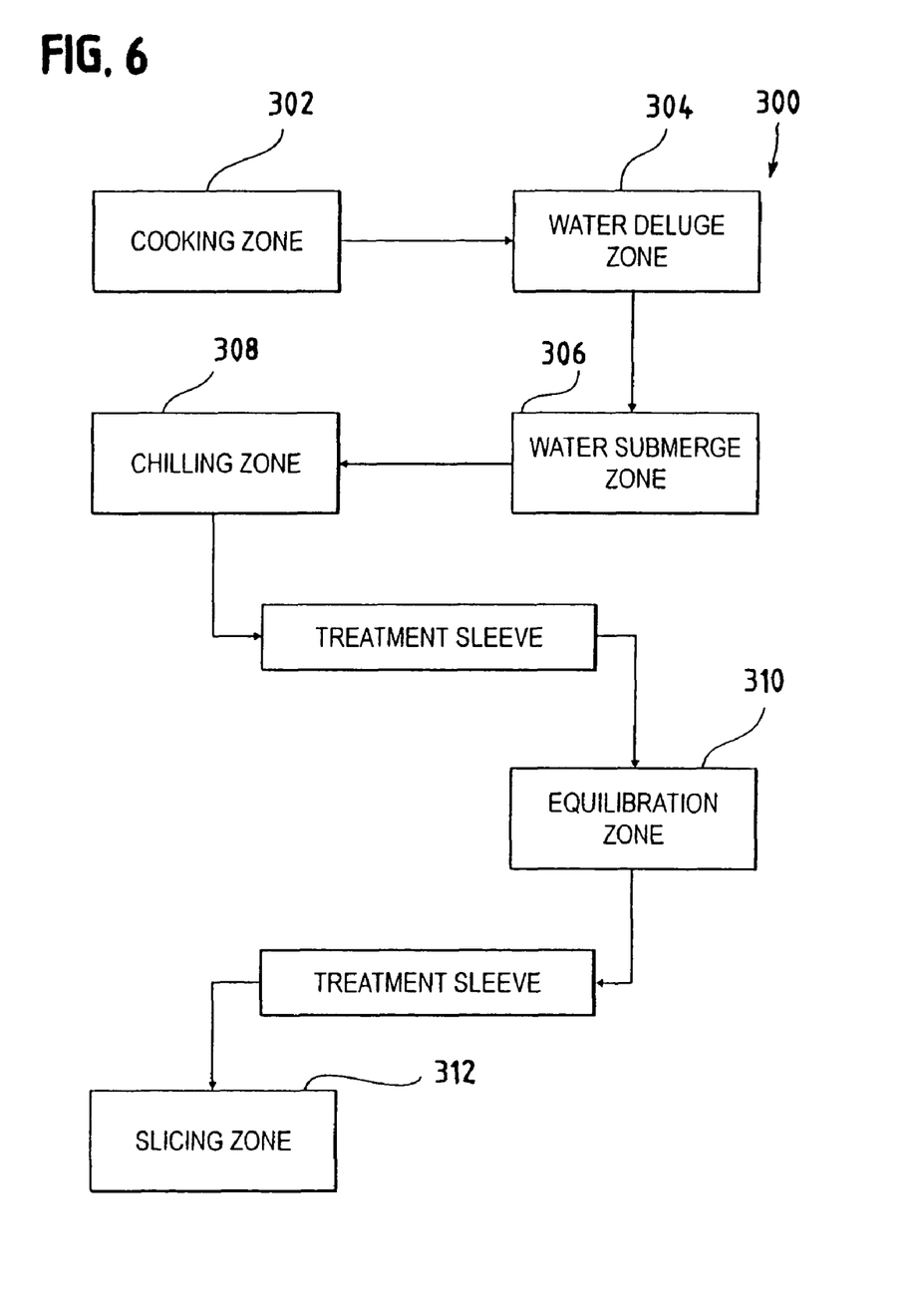
FIG. 6 is a diagrammatic flow chart depicting a product treatment cycle.
Figure 7:
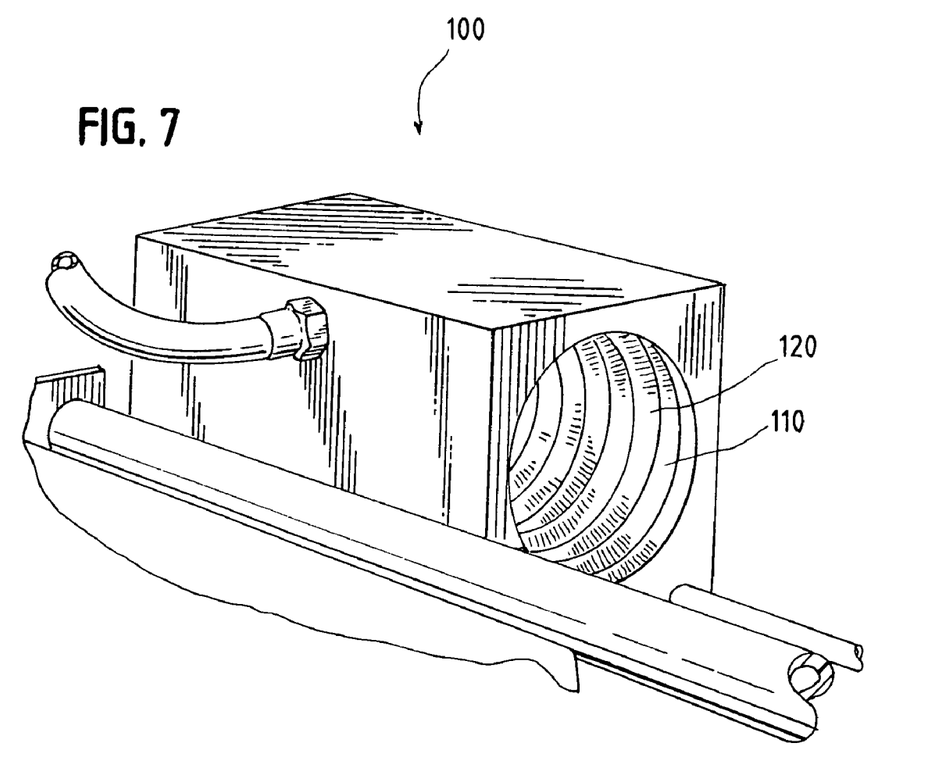
FIG. 7 is a perspective view of a steam sleeve according to a second embodiment having multiple helical flow channels.

The steam sleeve 10, 100, 200 may be used in a commercial food processing operation 300. The commercial food processing operation may proceed through multiple treatment areas, as depicted in FIG. 6. The treatment areas where the food product is subjected to different treatments can include a cooking zone 302, a water deluge zone 304, a water submergence zone 306, a chilling zone 308, an equilibration zone 310, and a slicing and packaging zone 312. The sleeve 10, 100 or 200 is preferably used after the chill zone 308 and prior to the equilibration zone 310. The sleeve is also preferably used prior to the slicing and packaging zone 312. However, the sleeve 10, 100 or 200 can be used between or as part of other operations.

Figure 19:
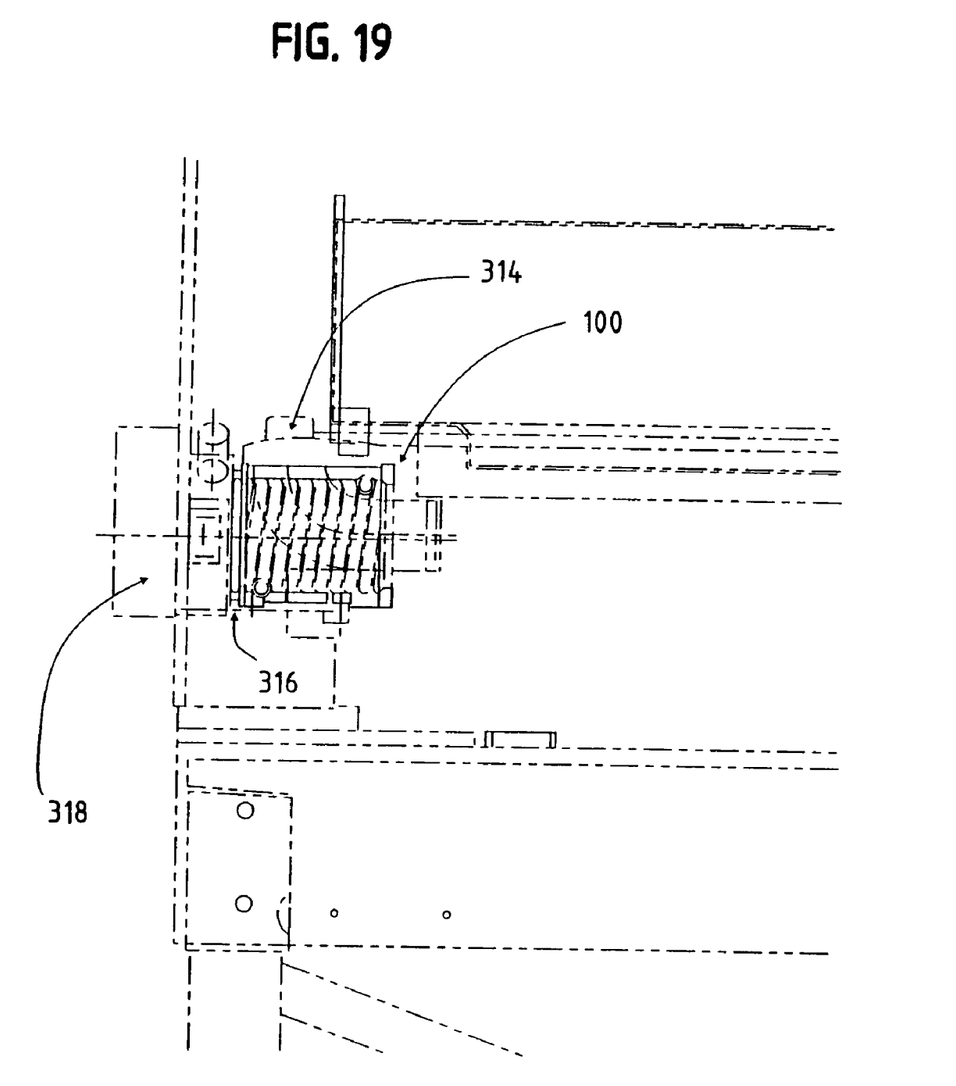
FIG. 19 is a diagrammatic side elevation view of the steam sleeve of FIG. 14 positioned for use with a slicing mechanism.

Various other equipment can be used with the sleeve 10, 100 or 200 during the food processing operation 300. For example, a steam hood 314 can be positioned adjacent the sleeve 10, 100 or 200 in order to remove excess steam and/or condensate proximate the exterior of the sleeve 10, 100 or 200, as depicted in FIG. 19. The removal of excess steam and/or condensate can desirably reduce moisture levels which can contribute to microbial activity in the environment proximate the sleeve 10, 100 or 200.

A slide gate 316 may be provided at one or both of the entrance and exit openings of the sleeve 10, 100 or 200 in order to prevent the escape of steam prior to the food product 5 being fed adjacent to the gate 316. To this end, the gate 316 is configured to seal the exit opening, downstream of the entrance opening and in the feed direction, of the sleeve 10, 100 or 200 when in a closed position. The gate 316 is shiftable to an open position, such as when the food product is spanning the interior of the sleeve 10, 100 of 200 between the entrance and exit openings thereof, allowing passage fo the food product 5 through the sleeve 10, 100 or 200. The gate 316 preferably is formed of a plastic, and may be an ultrahigh molecular weight plastic such as DELRIN®. The gate 316 may be slid along pins projecting from the downstream end of the sleeve, and may be controlled by a motor or an air cylinder.

The use of the gate 316 also allows for the sleeve 10, 100 or 200 to be used for treating the leading end face of the food product 5, such as when the food product is initially being fed through the entrance opening of the steam sleeve and the gate 316 is in its closed position, thereby allowing for steam to leave the channels and contact the leading end face of the food product 5. The trailing end face of the food product can be treated by stopping the forward movement of the food product 5 just before the trailing face exits the sleeve, and then retracting the pusher portion 44 to briefly treat the pusher portion 44 face and the trailing end face of the food product 5. After treatment of the trailing end face of the food product 5, the trailing end face can be advanced out of the sleeve 10, 100, or 200.

When used prior to a slicing zone 314, the steam sleeve 10, 100 or 200 is preferably placed immediately adjacent the slicing apparatus 318, as illustrated in FIG. 19, in order to minimize spacing between the exit opening of the sleeve 10, 100 or 200 and the slicing apparatus and thus minimize exposure of the food product 5 prior to slicing.

As will be appreciated, methods and apparatus for treating a surface of a food product are provided using a fluid having properties selected for treating the surface and bringing the fluid into contact with an outer surface of the food product in a generally continuous manner in a commercial food processing environment. The invention is not limited to the embodiments described hereinabove or to any particular embodiments. For example, various modifications to the number, direction, and size of the flow channels will result in substantially the same invention.

The invention is defined more particularly by the following claims:

The invention claimed is:

1. A method of treating an outer surface of a food product, the method comprising:
   placing a food product having an outer surface on an advancement mechanism;
   providing a steam sleeve for generating a flow of steam having selected properties to treat the outer surface of the food product, the steam sleeve having an interior wall, an entrance and an exit, the steam sleeve having an interior length defined by the distance between the entrance and the exit;
   passing the food product in a feed direction through the steam sleeve using the advancement mechanism, the food product having a length greater than the interior length of the steam sleeve such that the food product simultaneously extends beyond both the entrance and exit during at least part of the step of passing the food product through the steam sleeve; and
   generating the flow of steam in the steam sleeve while the food product is passing therethrough, the flow of steam contacting the outer surface of the food product for treatment of the outer surface of the food product.

2. A method of treating an outer surface of a food product in accordance with claim 1, wherein the step of generating the flow of steam in the steam sleeve while the food product is passing therethrough includes the step of circulating the flow of steam in the steam sleeve within an inwardly open channel formed in the interior wall of the sleeve, the channel having an inlet for introduction of the steam into the sleeve and an outlet for removal of the steam and condensate from the sleeve.

3. A method of treating an outer surface of a food product in accordance with claim 2, wherein the channel is generally circular and aligned perpendicular relative to a longitudinal axis of the food product, and the step of circulating the flow of steam in the steam sleeve within a channel includes the step of introducing the steam into the entrance of the channel with a tangential velocity effective to generate a circular flow directing at least some of the steam condensation away from the outer surface of the food product.

4. A method of treating an outer surface of a food product in accordance with claim 3, wherein the step of circulating the flow of steam in the steam sleeve comprises directing the flow of steam through a helical channel.

5. A method of treating an outer surface of a food product in accordance with claim 4 wherein the step of directing the flow of steam through a helical channel includes positioning the inlet and outlet so that the flow of steam from entrance to exit of the sleeve is in a general direction opposite to that of the feed direction of the food product.

6. A method of treating an outer surface of a food product in accordance with claim 4, including the step of providing more than one set of helical channels each having their own inlet for introduction of the steam into the sleeve and outlet for removal of the steam from the sleeve.

7. A method of treating an outer surface of a food product in accordance with claim 6, including the step of positioning the inlet and outlet of one of the helical channels so that the flow of steam is in a general direction opposite to that of the feed direction of the food product and positioning the inlet and outlet of another of the helical channels so that the flow of steam is in the same general direction as that of the feed direction of the food product.

8. A method of treating an outer surface of a food product in accordance with claim 1, wherein the step of passing the food product in a feed direction through the steam sleeve using the advancement mechanism includes the step of forming a substantial seal between the outer surface of the food product and at least one of the entrance and exit of the steam sleeve using a generally flexible wiper element.

9. A method of treating an outer surface of a food product in accordance with claim 1, wherein the step of passing the food product in a feed direction through the steam sleeve using the advancement mechanism includes the step of continuously advancing the food product with the advancement mechanism during the step of generating the flow of steam in the steam sleeve.

10. A method of treating an outer surface of a food product in accordance with claim 3, wherein the step of circulating the flow of steam in the steam sleeve within a channel having an inlet for introduction of the steam into the sleeve and an outlet for removal of the steam and condensate from the sleeve includes the step of forming multiple single-revolution channels each having their own inlet and outlet.

11. A method of treating an outer surface of a food product in accordance with claim 1, wherein the passing of the food product in a feed direction through the steam sleeve using the advancement mechanism occurs at a rate, the method including the step of selecting the rate and the selected properties of the fluid to achieve a temperature of surface and immediate depth of the food product effective to provide for slicability of the food product.

12. A method of treating an outer surface of a food product in accordance with claim 1, wherein the steps of passing the food product in a feed direction through the steam sleeve using the advancement mechanism generating the flow of steam in the steam sleeve while the food product is passing therethrough occur immediately prior to a slicing station where an end of the food product is sliced.

13. A method of treating an outer surface of a food product in accordance with claim 12, wherein a sealing gate is positioned adjacent the exit opening of the steam sleeve, the sealing gate being selectively shiftable between a sealing position substantially closing the exit opening and an unsealing position allowing access to the exit opening.

14. A method of treating an outer surface of a food product in accordance with claim 13, including the following steps:
positioning the sealing gate in the sealing position when the food product enters the steam sleeve;
maintaining the sealing gate in the sealing position as a leading face of the food product is advanced through the sleeve during the step of generating the flow of steam in the steam sleeve for treatment of the leading face of the food product; and
shifting the sealing gate from the sealing position to the unsealing position when the leading face of the food product has been advanced proximate thereto to allow the food product to be advanced through the exit opening of the steam sleeve.

15. A method of treating an outer surface of a food product in accordance with claim 1 including the step of retracting the advancement mechanism away from a trailing face of the food product while the trailing face of the food product is positioned within the steam sleeve for a period of time sufficient to provide steam treatment to the trailing face of the food product prior to advancement of the food product through the exit opening of the steam sleeve with the advancement mechanism.

16. A method of treating an outer surface of a food product in accordance with claim 1, wherein the steps of passing the food product in a feed direction through the steam sleeve using the advancement mechanism generating the flow of steam in the steam sleeve while the food product is passing therethrough occur immediately after a cooling operation where the outer surface of the food product is cooled.

17. A method of treating an outer surface of a food product, the method comprising:
placing a food product having an outer surface on an advancement mechanism;
providing a steam sleeve for generating a flow of steam having selected properties to treat the outer surface of the food product, the steam sleeve having an interior wall, an entrance and an exit, the steam sleeve having an interior length defined by the distance between the entrance and the exit;
passing the food product in a feed direction through the steam sleeve using the advancement mechanism; and
generating the flow of steam in the steam sleeve and circulating the flow of steam in the steam sleeve within a channel formed in the interior wall of the sleeve, the channel having an inlet for introduction of the steam into the sleeve and an outlet for removal of the steam and condensate from the sleeve, the channel inwardly open to an interior of the sleeve while the food product is passing therethrough, the flow of steam contacting the outer surface of the food product for treatment of the outer surface of the food product.

18. The method of claim 17, further including the step of at least partially blocking at least one of the entrance and exits of the steam sleeve using the food product during the step of generating the flow of steam in the steam sleeve.

19. The method of claim 17, further including circulating the flow of steam in the channel around the perimeter of the product multiple times between an inlet and an outlet of the channel.

20. The method of claim 17, including the step of circulating the flow of steam in a plurality of channels inwardly open to an interior of the sleeve.

21. The method of claim 17, wherein the food product has a length greater than the interior length of the steam sleeve, and the step of passing the food product in the feed direction through the steam sleeve further includes the step of simultaneously extending the food product beyond both the entrance and exit.

* * * * *